United States Patent [19]

Bastiaansen

[11] Patent Number: 5,258,208
[45] Date of Patent: Nov. 2, 1993

[54] POLARIZING FILM MADE OF SEMICRYSTALLINE POLYOLEFINE

[75] Inventor: Cornelis W. M. Bastiaansen, Maastricht, Netherlands

[73] Assignee: DSM N.V., Heerlen, Netherlands

[21] Appl. No.: 897,070

[22] Filed: Jun. 11, 1992

[30] Foreign Application Priority Data

Jun. 11, 1991 [NL] Netherlands ............... 9101008

[51] Int. Cl.$^5$ ............................................. C09K 19/00
[52] U.S. Cl. ................................ 428/1; 428/500; 428/411.1; 524/89
[58] Field of Search ................. 428/500, 411.1, 1; 524/89

[56] References Cited

U.S. PATENT DOCUMENTS 4,824,882  4/1989  Nakamura et al. ............... 524/89
4,842,781  6/1989  Nishizawa et al. ............... 24/89

Primary Examiner—Edith Buffalow
Attorney, Agent, or Firm—Cushman, Darby & Cushman

[57] ABSTRACT

Process for the manufacture of a polarizing film by drawing a polymer film containing a dichroic dye at a temperature above the glass transition temperature of the polymer, the polymer film consisting mainly of a semi-crystalline polyolefine and being drawn at a temperature below the crystalline melting point of the polyolefine, the dye being present in liquid form at that drawing temperature, and a polarizing dye-containing polyolefine film having a dichroic ratio of at least 15.

4 Claims, No Drawings

POLARIZING FILM MADE OF SEMICRYSTALLINE POLYOLEFINE

The invention relates to a process for the manufacture of a polarizing film by drawing a polymer film containing a dichroic dye at a temperature above the glass transition temperature of the polymer.

Dichroic dyes are dyes possessing anisotropic optical properties. This applies in particular to the absorption of light in the direction of the molecular axis and the directions normal thereto. If the molecules of a substance having such a characteristic can be oriented in a fixed direction in a polymer film, then it is possible to produce a coloured polarizing film.

From U.S. Pat. No. 4,842,781 a process is known for the manufacture of a polarizing film by melt extrusion of a hydrophobic polymer mixed with one or more water-insoluble dyes, chosen from special groups, to a film, and drawing thereof at a temperature above but close to the glass transition temperature. In that process, preference is given to films of low crystallinity and to a drawing temperature that is close to the glass transition temperature.

A drawback of that process is that it cannot be applied with satisfactory results to semicrystalline polyolefines, such as polyethene and polypropene. However, semicrystalline polyolefines can be processed to uniaxially drawn films with a high degree of orientation, which is of advantage in orienting of the dyes in polarizing films. In addition, films made of semicrystalline materials possess very good mechanical properties and they can be produced in a wide thickness range, so that polarizing films of semicrystalline polyolefines are widely applicable.

The object of the invention is to provide a process for the manufacture of polarizing films from semicrystalline polymers, with a high dichroic ratio and the strongly polarizing properties associated with it.

That object is accomplished according to the invention due to the polymer film consisting mainly of a semicrystalline polyolefine and its being drawn at a temperature below the crystalline melting point of the polyolefine, and the dye in the film being present in liquid state at that drawing temperature. By a dye in the liquid state is understood in the context of the present invention a dye in the molten state or a solution of a dye. The liquid state of the dye in the context of the invention is characterized by the absence of crystallinity or anisotropy and thus is an essentially isotropic, non-crystalline state. Surprisingly it has appeared that despite the absence of any preferred direction of the dye in the liquid state it is nearly perfectly oriented in the ultimate stretched film.

The film obtained by the process according to the invention has a dichroic ratio of 15 or higher and a strongly polarizing effect. Additional advantages of this film are its good mechanical properties and its high degree of moisture resistance and the high value for the polarizing efficiency. Also the durability, being defined as the period during which the film has to be exposed to an environment having a relative humidity of 95% and a temperature of 80° C. to cause a 5% decrease in polarizing efficiency.

The dichroic ratio, R, is a measure of the polarizing optical properties of the film. From R the order parameter S can be derived, which is a measure of the degree of orientation of the dye molecules. The dichroic ratio R is defined as:

$$R = A_{par}/A_{perp}$$

where $A_{par}$ and $A_{perp}$ are determined by absorption spectroscopy.

The absorption at the wave length of maximum absorption is measured using a Perkin Elmer Lamda 9 UV/VIS spectrophotometer having a polarizer placed in both the sample and the reference beam. An absorption spectrum between 400 and 700 nm is recorded with the optical axis of a film sample being parallel to the optical axis of the polarizer in the sample beam and then after rotating the sample polarizer over 90°. Thus the absorption at the wave length of maximum absorption in both situation, denoted by $A_{par}$ and $A_{perp}$ respectively are determined, from which R can be calculated.

Order parameter S is calculated from R as:

$$S = (R-1)/(R+2) * 100\%$$

The polarizing efficiency (PE) also is a measure for the polarizing effect of the film, which will be defined later.

From EP-A-348964 it is known to produce a polarizing film containing an essential apolar dichroic dye showing liquid crystal properties. The apolar character clearly follows from the dyes disclosed and the method for their preparation. This process, in contrast to the present invention is not applicable to produce polarizing films containing polar dyes showing liquid crystal properties and also not those containing dyes not showing liquid crystal properties. This known process consequently does not solve the problem of producing polarizing films containing other dyes than those showing liquid crystal properties and the dyes during stretching being in a non-liquid state.

Polarizing films are used for instance in combination with liquid crystal displays (LCD's) as monochromatic display units in calculators and other electronic instruments, and as non-reflecting layers in photo frames, in sunglasses and on windowpanes.

Dye-containing polymer films can be obtained by numerous processes known per se. Examples of these are the mixing in the molten state of polymer and dye and producing a film thereof; the dissolving of the polymer in a solvent and dissolving or suspending of the dye in the resulting solution, from which a film is then obtained by extruding or casting; the impregnating with the dye of a film made from a polymer melt or solution.

In the process according to the invention a semicrystalline polyolefine is used as polymer. In a semicrystalline polyolefine at least part of the polyolefine is present in crystalline form besides an amorphous phase. In the process of drawing, the crystallinity generally increases; the crystallinity of the drawn polarizing film preferably is at least 40%. On account of their high degree of orientability, linear polyethylene or isotactic polypropene are used by preference. In the context of the invention, polyolefines are also understood to mean copolymers of two or more different polyolefines and mixtures of polyolefines.

The molecular weight of the polyolefines, reflected in the intrinsic viscosity (IV) of the polymer, may vary within wide limits. In case of application of polyolefines with a high IV, processing to a film of the polyolefine in the form of a solution is the most suitable process. Films obtained from a solution can as a rule be highly drawn and thereby acquire a high strength and modulus. Polymers having lower intrinsic viscosities have as a rule good melt processing characteristics, but acquire a less high strength by drawing. However, films made of polyolefine having a lower IV have less tendency to split. The one skilled in the art should be deemed capable of selecting the right polyolefine and the most suitable technique for processing it to a film, depending on the envisaged application.

The desired orientation of the dye molecules is achieved in the film according to the art by drawing a dye-containing polymer film close to the glass transition temperature. In the process according to the invention the drawing is effected at a temperature below the crystallization melting point of the polyolefine, preferably at a temperature of at most 70° C. below said melting point, which in the case of semicrystalline polyolefines is very far above the glass transition temperature. The glass transition temperature of polyethylene, for instance, is $-110°$ C., while the drawing of polyethylene is only reasonably well realizable at temperatures above 60° C.

As well as on the polarization, the quantity of dye in the polarizing film has an effect on the other optical properties, in particular the extinction of the film. The one skilled in the art will be able in a concrete case to choose the suitable quantity of dye for the envisaged application.

The dye should be in the liquid state in the drawing process. By a dye in the liquid state is understood in the context of the present invention a dye in the molten state or a solution of a dye. Suitable dyes for application in the process according to the invention are therefore dyes the melting point of which is below the drawing temperature or dyes that can be dissolved in a suitable solvent at a temperature below the drawing temperature. In the second embodiment it is also possible to apply dyes having melting points that are higher than the drawing temperature and even higher than the melting point of the polyolefine applied and which consequently cannot be used in the molten state.

The use of a solvent has the advantage that the temperature range in which the dye can be brought into a liquid state can be considerably extended below the melting point of the polyolefine, so dyes with a melting point above the melting point of the polyolefin still can be used. The solvent for the dye can be added at any suitable moment during the preparation of the polymer film to be drawn, but has to be added in any case before the drawing. If for example the film is made from a mixture of molten polyolefine and dye, the solvent can be added to this mixture; if the dye-containing film is made from a solution, a solution of the dye can be added to the polymer solution applied. The solvent for the dye can also be a solvent for the polyolefine but preferably it is a non-solvent for the polyolefin. The amount of solvent should be less than 50 times (w/w) the amount of dye, preferably less than 25 times and more preferably less than 15 times. Solvents having a polar and an apolar tail are preferably used when the degree of polarity of solvent and dye are differing considerably. Examples of these solvents are 4-hexyl-anilin, 1-octanyl, dodecyl-anilin, dodecyl-1,3-resorcin and, very suitable, N-dodecyl-pyrrolidon. The solvent is preferably chosen to have in combination with the dye the highest possible dissolution temperature within the range defined above. In that case the polarizing film can be used at the highest possible environmental temperature without loosing its properties. If the dye in the solvents known for it has a dissolution temperature so low as to restrict seriously the temperature range in which the polarizing film can be used, preferably a crosslinkable solvent is used, which is crosslinked during or after stretching of the film. The solvent can also be extracted from the film.

If in the drawing process the dye is not in the molten state, it appears that no film having the desired high dichroic ratio can be obtained, nor can such film be obtained if the drawing is effected above the crystalline melting point of the polymer, even if the dye is in the liquid state then. The crystalline melting point of the semicrystalline polyolefine is determined by means of differential scanning calorimetry according to ASTM Standard D3418/82 with a heating-up rate of 5° C. per minute.

In the preparation of the film according to the invention, more than one dye may be present in the film. In this way polarizing films can be obtained that possess the desired optical properties in different wavelength ranges, each of which is covered by one of the dyes that are present.

Examples of suitable dyes are antraquinone or mono-, di- or trisazo dyes, in so far as they melt or can be dissolved below the melting point(s) of one or more of the polyolefines.

The values of the dichroic R for the films produced by the process according to the invention are at least 15, which is amply sufficient for application as polarizing film in the application areas mentioned above. The degree of orientation, expressed in the order parameter S, thus amounts to at least 82%.

The invention also relates to a polarizing semicrystalline polyolefine film having a dichroic ratio of at least 15, preferably at least 20 and containing a dye, apolar dyes showing liquid crystal properties excluded. An apolar dye in this respect is to be understood as a dye not containing a polar group, examples of which are an OH-, NH2-or acetate group.

The invention will be elucidated by means of the following examples, without being restricted thereto. The quantities stated have been determined by the methods mentioned above.

The tensile strength and the modulus of elasticity are determined at room temperature by means of a Zwick 1435 tensile tester, applying a clamp-to-clamp distance of 150 mm and a drawing rate of 15 mm/min.

The polarizing efficiency (PE) of the films is determined by transmission measurements. The transmission at the wave length of minimum transmission is measured using a Perkin Elmer Lamda 9 UV/VIS spectrophotometer having a polarizer placed in both the sample and the reference beam. A transmission spectrum between 400 and 700 nm is recorded with the optical axis of a film sample being parallel to the optical axis of the polarizer in the sample beam and then after rotating the sample polarizer over 90°. Thus the transmission at the wave length of minimum transmission in both situation, denoted by $T_{par}$ and $T_{perp}$ respectively are determined. The polarizing efficiency is calculated then by the formula:

$$PE = \left[ \frac{T_{par} - T_{perp}}{T_{par} + T_{perp}} \right]^{\frac{1}{2}}$$

EXAMPLE I AND COMPARATIVE EXPERIMENTS A AND B

Polyethylene with an intrinsic viscosity of 16 dl/g, corresponding to a weight-average molecular weight of about $2 \times 10^6$ g/mol (Hostalen Gur 412 from Hoechst-/Ruhr-chemie) is dissolved in xylene at 130° C. to a concentration of 15 g/l. 0.3 g/l of a dye has previously been added to the xylene. The solution is poured into a flat-bottomed tray and cooled to room temperature, resulting in a dried dye-containing film. The film is drawn at 120° C., i.e. below the melting point of the polyethylene, which is about 137° C. The dyes used are:
Example I: anthraquinone with a melting point of 110° C.;
Comparative Experiment A: trisazo dye with a melting point of 160° C., and
Comparative Experiment B: anthraquinone dye with a melting point of 360° C.

Table I shows the values of the dichroic ratio R of the different dye-containing films for different degrees of drawing.

TABLE 1

|  | Degree of drawing | DIchroic ratio (—) | Order parameter (%) |
|---|---|---|---|
| Example I: | 8 | 8 | 70 |
|  | 15 | 15 | 82 |
|  | 25 | 21 | 87 |
|  | 50 | 28 | 90 |
| Comp. Exp. A: | 10 | 5 |  |
|  | 15 | 8 |  |
|  | 25 | 10 |  |
|  | 45 | 14 |  |
| Comp. Exp. B: | 15 | 1 |  |
|  | 3 | 2 |  |
|  | 40 | 3 |  |

Only with the dye having a melting point below the drawing temperature, Example I, are a dichroic ratio of 15 or higher and a polarizing efficiency over 90% achieved. The film with a degree of drawing of 50x in Example I has a modulus of elasticity of 80 GPa, a tensile strength of 2.4 GPa and a polarizing efficiency of 98.2% at a wave length of 520 nm.

EXAMPLE II

A melt-crystallized dye-containing film is produced by compressing for 30 minutes at 180° C. a film obtained by the process of Example I. The maximum degree of drawing is 4x. The dichroic ratio amounts to 20. The modulus of elasticity amounts to 3.6 GPa and the tensile strength to 0.3 GPa.

EXAMPLE III

In the same manner as in Example II a melt-crystallized film, containing the same dye as in Example I, is produced, on the understanding that the polyolefine applied is polyethene with an intrinsic viscosity of 4 dl/g, corresponding to a weight-average molecular weight of about 400,000 (Hostalen G.R. 7255P from Hoechst/Ruhrchemie). The dichroic ratio of the drawn film amounts to 19, 22, 25 and 28 at degree of drawing of 5, 10, 15 and 20x, respectively. The film drawn 20x possesses a modulus of elasticity of 30 GPa, a tensile strength of 0.8 GPa and a polarizing efficiency of 97.6% at a wave length of 520 nm.

COMPARATIVE EXPERIMENT C

A polyethylene film is produced by the method described in Example I. The film is drawn at 170° C., i.e. above the melting point of the polyethene. The film breaks at a degree of stretching of 1.2.

EXAMPLE IV

Example I is repeated with application of the dye used in Comparative Experiment A, on the understanding that 20 wt. % paraffin oil relative to the polymer is added to the solution. After evaporation of the xylene, the film containing paraffin oil and dye is stretched at 120° C., i.e. below the melting point of the polyethene and the dye used (160° C.). At this temperature, however, the dye in question dissolves in paraffin oil.

The dichroic ratio at a degree of drawing of 20, 40 and 50x is 14, 20 and 23, respectively. The film having a dichroic ratio of 10 has a polarizing efficiency of 95.1% at a wave length of 428 nm.

EXAMPLE V

Example I is repeated with a mono-azo dye having a melting point of 128° C. N-dodecyl-pyrrolidon is added in amount of 4 ml/l. The dye-containing film is stretched at 130° C. to a stretching ratio of 35. The dichroitic ratio of the stretched film is 25 at a wave length of 410 nm. The polarizing efficiency at this wave length is 96.6%.

EXAMPLE VI

Comparative Experiment A is repeated the difference being that N-dodecyl-pyrrolidon is added to the starting solution in an amount of 4 ml/l. After stretching of the dye containing film at 135° C. to a stretching ratio of 35 a stretched polarizing film is obtained having a dichroic ratio of 38 at a wawe length of 428 nm. The polarizing efficiency at this wave length is 99.0%.

COMPARATIVE EXAMPLE D

Example VI is repeated the difference being that 18 ml/l N-dodecyl-pyrrolidon is added. The resulting film has a dichroic ratio of 5 at a wave length of 428 nm.

I claim:

1. Polarizing semicrystalline polyolefine film having a dichroic ratio of at least 15 and containing a dye which is soluble in an organic solvent at a temperature below the melting point of the polyolefin, apolar dyes showing liquid crystal properties being excluded.

2. Polarizing film according to claim 1, characterized in that the dichroic ratio is at least 20.

3. Polarizing film according to claim 1, wherein the dye is selected from the group consisting of anthraquinone dye, monoazo dye, diazo dye, and triazo dye.

4. Polarizing film according to claim 1, wherein the solvent is selected from the group consisting of 4-hexyl-anilin; 1-octanyl, dodecyl-anilin; dodecyl-1, 3-resorcin; N-dodecyl-pyrrolidon and xylene.

* * * * *